US007999662B2

(12) United States Patent  
Ohayon et al.

(10) Patent No.: US 7,999,662 B2  
(45) Date of Patent: Aug. 16, 2011

(54) UNIVERSAL ELECTRONIC IMMOBILIZING FOR A VEHICLE

(76) Inventors: Salomon S. Ohayon, Jerusalem (IL); Amihai Ohayon, Jerusalem (IL)

(*) Notice: Subject to any disclaimer, the term of this patent is extended or adjusted under 35 U.S.C. 154(b) by 382 days.

(21) Appl. No.: 11/990,436

(22) PCT Filed: Aug. 15, 2006

(86) PCT No.: PCT/IL2006/000946  
§ 371 (c)(1), (2), (4) Date: Feb. 14, 2008

(87) PCT Pub. No.: WO2007/020637  
PCT Pub. Date: Feb. 22, 2007

(65) Prior Publication Data  
US 2009/0102621 A1    Apr. 23, 2009

Related U.S. Application Data

(60) Provisional application No. 60/707,986, filed on Aug. 15, 2005.

(51) Int. Cl.  
*B60R 25/10* (2006.01)

(52) U.S. Cl. .................. 340/426.12; 180/287

(58) Field of Classification Search ............ 340/426.12, 340/426.11, 426.13; 180/287; 307/10.2–10.6  
See application file for complete search history.

(56) References Cited

U.S. PATENT DOCUMENTS

| 5,181,403 | A | | 1/1993 | Lii |
| 5,276,728 | A | * | 1/1994 | Pagliaroli et al. ............. 180/287 |
| 5,349,329 | A | * | 9/1994 | Smith ...................... 340/426.12 |
| 5,382,948 | A | * | 1/1995 | Richmond .................... 180/287 |
| 5,397,925 | A | * | 3/1995 | Carlo et al. .................. 307/10.3 |
| 5,623,245 | A | * | 4/1997 | Gilmore ................... 340/426.12 |
| 2009/0102621 | A1 | | 4/2009 | Ohayon et al. |

FOREIGN PATENT DOCUMENTS

| EP | 0745521 | 12/1996 |
| WO | WO 00/01562 | 1/2000 |

OTHER PUBLICATIONS

International Preliminary Report on Patentability Dated Feb. 28, 2008 From the International Bureau of WIPO Re.: Application No. PCT/IL2006/000946.  
Office Action Dated Jan. 12, 2011 From the Israel Patent Office Re. Application No. 189304 and Its Translation Into English.

* cited by examiner

Primary Examiner — John A Tweel, Jr.

(57) ABSTRACT

A vehicle security system for securing a vehicle against theft, the system comprising, a driving function disablement component configured to bias against a moveable vehicle component, thereby to disable a driving function when biased, a remotely operable transducer configured to maintain or release biasing in the driving function disablement component, and a wireless handheld transceiver configured to transmit a wireless drive-activating signal to operate the transducer.

23 Claims, 4 Drawing Sheets

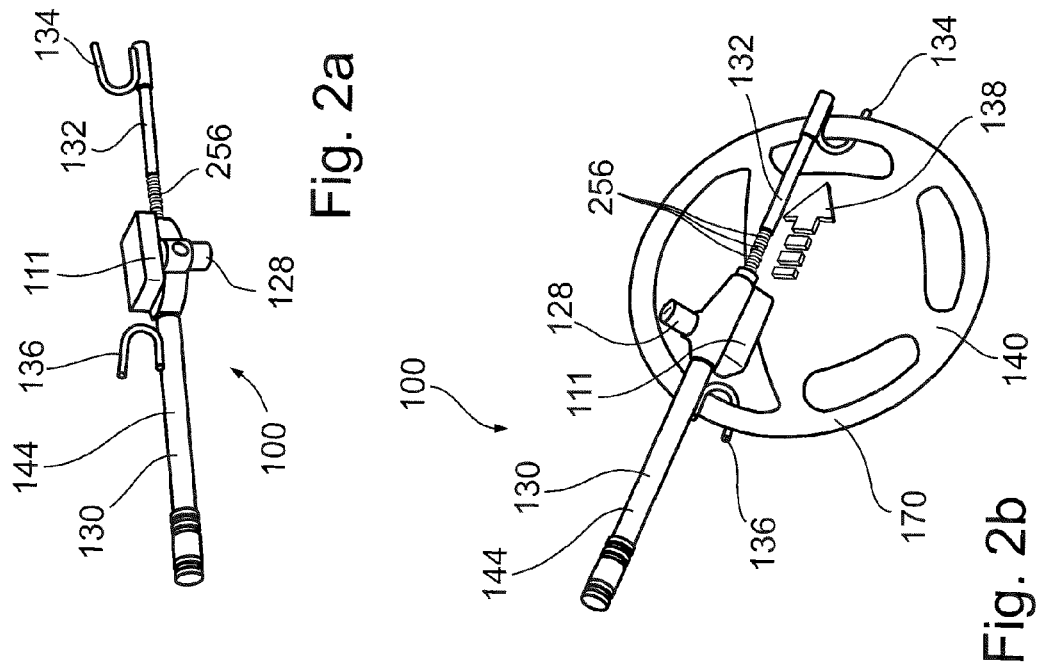
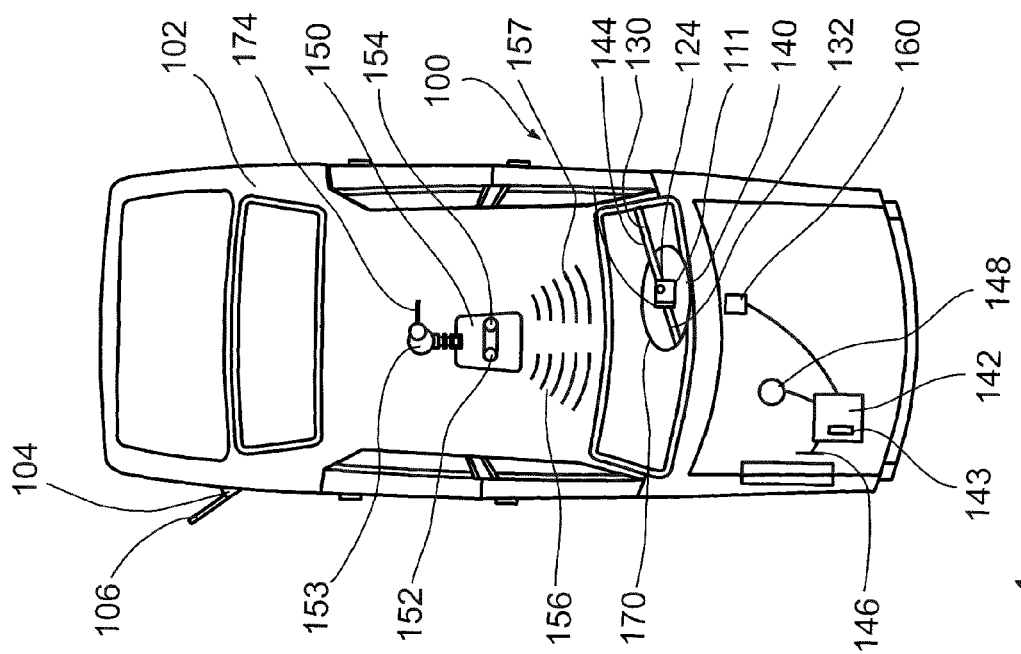

UNIVERSAL ELECTRONIC IMMOBILIZING FOR A VEHICLE

RELATED APPLICATIONS

This Application is a National Phase of PCT Patent Application No. PCT/IL2006/000946 having International Filing Date of Aug. 15, 2006, which claims the benefit of U.S. Provisional Patent Application No. 60/707,986 filed on Aug. 15, 2005. The contents of the above Applications are all incorporated herein by reference.

FIELD OF THE INVENTION

The present invention relates generally to systems that prevent vehicle theft and, more particularly, to systems that wirelessly disable one or more vehicle-enabling components and to universal electronic Immobilizing for a vehicle.

BACKGROUND OF THE INVENTION

Mechanical vehicular locking devices that lock a manually operated vehicle component provide some form of physical impediment to the normal operation of the vehicle.

The mechanical steering-wheel locking crosspiece, for example, comprises a lockable crosspiece that is manually biased and locked against a vehicle steering wheel. One end of the crosspiece typically extends outward of the steering wheel so that upon rotation, the end contacts a surface associated with the vehicle passenger cabin, thereby preventing full rotation of the steering wheel.

Other locking crosspieces that bias and lock against manually operated vehicle components include, inter alia, crosspieces that bias against a gearshift and a handbrake lever.

The locking crosspiece is simple to use, can be implemented on a wide variety of vehicle brands, can be purchased off-the-shelf and deployed without intervention of a vehicle mechanic. Additionally, the locking crosspiece is easily spotted through the vehicle windows, thereby acting as a visual deterrent to a would-be vehicle thief. Electronic immobilizers that are not visible, for example, may not provide a deterrent until the thief has already entered the vehicle; often following damage to the vehicle door locks and/or windows.

The locking crosspiece, however, has a significant drawback in that it is typically unlocked using a simple key, making the vehicle an easy theft target by an experienced thief with a lock-pick.

Further, the locking crosspiece is a stand-alone device that the operator may choose to deploy without activating a secondary device, for example a device that electronically disables an electronic vehicle-enabling component, for example a barking system, a fuel pump or total vehicle immobilizer. Without such secondary activation, the vehicle becomes an easy and tempting target to a would-be vehicle thief.

Additionally, the locking crosspiece requires a separate key to lock and unlock. Finding the crosspiece key in a purse, pocket or on a ring of keys can be a nuisance that may deter the vehicle operator from using the steering wheel crosspiece lock altogether. In general it is unusual for users to be prepared to use both an immobilizer and a physical lock together. Those who have an immobilizer do not make use of an additional physical lock because of the additional bother.

SUMMARY OF THE INVENTION

Some embodiments of the present invention successfully address at least some of the shortcomings of the prior art by providing a vehicle security system for securing a vehicle against theft, the system comprising, a driving function disablement component configured to bias against a moveable vehicle component, thereby to disable a driving function when biased, a remotely operable transducer configured to maintain or release biasing in the driving function disablement component, and a wireless handheld transceiver configured to transmit a wireless drive-activating signal to operate the transducer.

In embodiments, the transducer includes a locking mechanism for locking the driving function disablement component in the biased position. In embodiments, the moveable vehicle component is any one of the group consisting of a steering wheel, a tire, a clutch, a gearshift, an accelerator pedal, a hand brake lever, and a brake pedal.

In embodiments, the system further comprises an immobilizer and the wireless handheld transceiver is further configured to operate the immobilizer. In embodiments, the immobilizer comprises an electronic vehicle component-immobilizing relay.

In embodiments, the electronic vehicle component is any one of the group consisting of, a motor ignition, a fuel pump, a fuel injector, a gearshift, a total vehicle immobilizer, and a brake lock. In embodiments, the transceiver operable immobilizing relay is configured to replace a standard vehicle-immobilizing relay.

In embodiments, the drive transceiver includes a docking button such that pressing the button activates the wireless drive transceiver to receive wireless signals from the handheld transceiver. In embodiments, the activated transceiver and the wireless handheld transceiver automatically wirelessly communicate upon the activation.

In embodiments, the wireless handheld transceiver additionally includes a manual input configured to activate wireless transmission of the wireless signal following pressing the docking button.

In embodiments, the transducer includes a timing sensor configured to sense a fixed period of time in the absence of vehicle movement and release of the biasing against the moveable component and, following the period of time, reinduce the biasing.

In embodiments, the relay additionally includes a time delay circuit which, following a set period time after receiving a wireless relay signal and in the absence of vehicle movement and moveable component movement, the relay again immobilizes the electronic component.

In embodiments, the wireless handheld transceiver, the wireless drive transceiver and the immobilizer include programmable memory components configured to be programmed with a unique code such that, the handheld transceiver wirelessly transmits the code, the wireless drive transceiver receives and recognizes the wirelessly transmitted code and releases the biased disablement component, and the immobilizer receives and recognizes the transmitted code and enables the vehicle component.

In embodiments, the wireless handheld transceiver, the wireless drive transceiver and the immobilizer include programmable memory components configured to be programmed with unique codes such that, the handheld transceiver wirelessly transmits a first code and a second code, the wireless drive transceiver receives and recognizes the wirelessly transmitted first code and releases the biased disablement component, and the immobilizer receives and recognizes the transmitted second code and enables the vehicle component.

In embodiments at least one of the wireless handheld transceiver, the immobilizer, and the wireless drive transceiver, includes a programmable input for inputting the wireless code.

In embodiments, the system includes a drive activation time delay circuit that delays unlocking the locking member by a given period of time following a user-activated input, the time delay circuit being operatively associated with at least one of the wireless handheld transceiver, and the drive wireless transceiver.

In embodiments, the moveable component further includes a manually activated lock configured to manually release the biasing. In embodiments, the manually activated locking mechanism comprises a lock barrel configured to receive a user-deployable key. In embodiments, the disablement component is configured to be manually biased against the moveable vehicle component. In embodiments, the disablement component is configured to be manually removed from the component following releasing the biasing in the component.

In embodiments, the driving function disablement component comprises a bar that is slidingly set in a hollow tube. In embodiments, the driving function disablement component includes at least one first projection configured to press against the moveable vehicle component when the disablement component is in the biased configuration.

In embodiments, the disablement component is configured to bias against a vehicle steering wheel and at least one end of the disablement component is configured to extend beyond the wheel and contact a surface associated with a passenger cabin of the vehicle during rotating of the wheel, thereby substantially preventing rotation of the wheel.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred method of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the methods of the invention may be embodied in practice.

FIG. 1 shows a schematic diagram of a vehicle disabling system installed in a vehicle, according to an embodiment of the invention;

FIGS. 2A-2D show lockable steering wheel cross-pieces in various stages of deployment, according to an embodiment of the invention;

DESCRIPTION OF EMBODIMENTS OF THE INVENTION

Figure 2C:
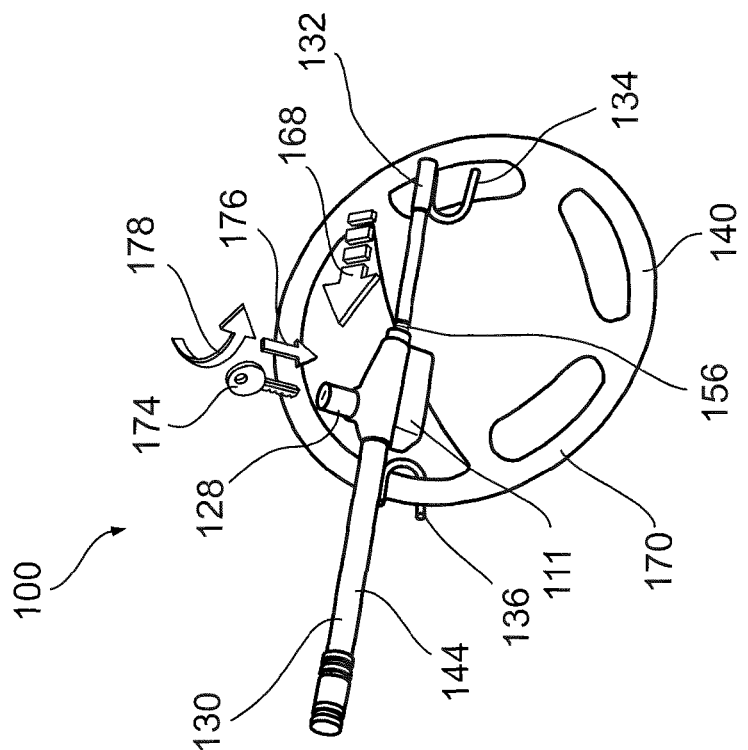

The present invention relates to a lockable crosspiece that is easily biased and locked in position on a manually operated vehicle driving component and that optionally works in conjunction with a wireless electronic vehicle component disabler, such as an immobilizer.

The principles and uses of the teachings of the present invention may be better understood with reference to the accompanying description, Figures and examples. In the Figures, like reference numerals refer to like parts throughout.

Before explaining at least one embodiment of the invention in detail, it is to be understood that the invention is not limited in its application to the details set forth herein. The invention can be implemented with other embodiments and can be practiced or carried out in various ways.

It is also understood that the phraseology and terminology employed herein is for descriptive purpose and should not be regarded as limiting.

Unless otherwise defined, all technical and scientific terms used herein have the same meaning as commonly understood by one of ordinary skill in the art to which the invention belongs. In addition, the descriptions, materials, methods, and examples are illustrative only and not intended to be limiting. Methods and materials similar or equivalent to those described herein can be used in the practice or testing of the present invention.

As used herein, the terms "comprising" and "including" or grammatical variants thereof are to be taken as specifying the stated features, integers, steps or components but do not preclude the addition of one or more additional features, integers, steps, components or groups thereof. This term encompasses the terms "consisting of" and "consisting essentially of".

As used herein, "a" or "an" mean "at least one" or "one or more". The use of the phrase "one or more" herein does not alter this intended meaning of "a" or "an".

Operation of System 100

FIG. 1 is a schematic diagram of a vehicle disabling system 100 installed in a vehicle 102. According to an embodiment of the invention system 100 includes a biasable locking component or lockable crosspiece 144 that is shown biased against a vehicle steering wheel 140—a movable driving component.

In an exemplary embodiment, in response to transmission of wireless signals 156 from a hand-held wireless transceiver 150 a ratchet extension 117 (FIG. 3) is activated and removed from ratchet 256, allowing unbiasing and removal of crosspiece 144 from steering wheel 140 as explained below.

Additionally, system 100 includes an electronic relay 142 having a wireless transceiver 143 that receives wireless signals 156 from handheld transceiver 150. In an exemplary embodiment, upon shutting vehicle 102 by shutting a motor ignition 160, relay 142 disables motor ignition 160 in a manner that prevents activation of ignition 160 until transceiver 143 receives signals 156. Thus, relay 142 effectively immobilizes vehicle 102.

Additionally or alternatively, relay 142 is connected to alternative electronic components including, inter alia, a brake lock 146 and/or a fuel pump 148.

In an exemplary embodiment, relay 142 including transceiver 143 is configured to fit a standard vehicle-immobilizing relay receptacle. Additionally, relay 142 incorporates polarity independent circuitry so that relay 142 is empowered by the availability of voltage between any pair of contacts on relay 142. These features ensure that relay 142 is easily retrofitted in a postproduction vehicle in a simple procedure that, in some instances is performed by the driver of vehicle 102.

An exemplary description of an immobilizer relay 142 that can be installed in a standard relay receptacle is seen in Pending U.S. patent application Ser. Nos. 10/275,212 and 10/883,858, filing dates, Nov. 1, 2002 and Jul. 2, 2004, respectively.

In exemplary embodiments, handheld transceiver 150 includes a key ring 153 to conveniently attach thereto a key 174 used in manually addressing a key lock 124 on crosspiece 144 as will be explained below.

In addition, handheld transceiver 150 includes a first actuator button 152 and second activator button 154 that produce a first wireless signal 156 and a second wireless signal 157.

In some embodiments, as described above, first wireless signals 156 are received by crosspiece transceiver 125 and relay transceiver 143 to allow removal of crosspiece 144 and enablement of relay 142 respectively. In such embodiments, button 154 is optionally utilized to send wireless signals 157 to activate a wireless receiver and opener 104 associated with a fuel hatch 106.

In other embodiments, signal 156 activates crosspiece transceiver 125, while signal 157 activates relay transceiver 143. As will be explained below, signals 156 and/or 157 optionally comprise any type of wireless signal, including radio frequency (RF) and infrared signals; the many configurations of buttons 152 and 154 and types of signals 156 and 157 produced, being well-known to those familiar with the art.

FIG. 2A shows an exemplary lockable crosspiece 144 in greater detail, including a manual key lock 128, mechanism housing 111. A bar 132 having a first positioning hook 134, slides into a hollow tube 130 having a second positioning hook 136.

FIG. 2B shows exemplary deployment of crosspiece 144 on steering wheel 140 in which positioning hook 136 is positioned against a rim 170 of steering wheel 140 and bar 132 is advanced out of hollow tube 130 in a direction 138 so that positioning hook 134 presses against steering wheel rim 170. Ratchets 256 positioned along bar 132 interface with a locking mechanism explained below, locking crosspiece 144 on steering wheel 140.

To unlock crosspiece 144 using handheld transceiver 150, actuator button 152 is pressed to causes emission of a wireless signal 156, that is received by a wireless receiver 125 (shown in FIG. 3) within housing 111, that causes a drive 123 to rotate a worm gear 162 against a first gear 164, which causes a second gear 166 to rotate, thereby actuating a lever that presses against a ratchet barrel 113 causing ratchet extension 117 to remove from ratchets 256, allowing movement of bar 132 into tube 130.

Returning to FIG. 2C, with ratchet 256 unlocked, bar 132 is manually retracted toward housing 111 in direction 168 so that positioning hook 134 disengages from wheel rim 170, allowing tube 130 to move in direction 138, thereby allowing disengagement of positioning hook 136 from rim 170.

Figure 2D:
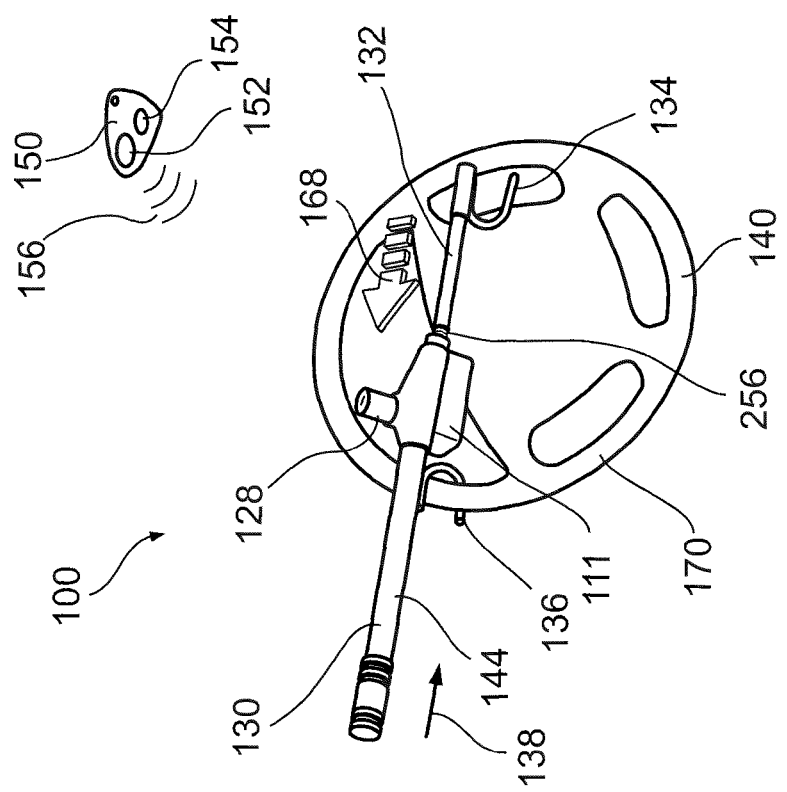
Figure 3:
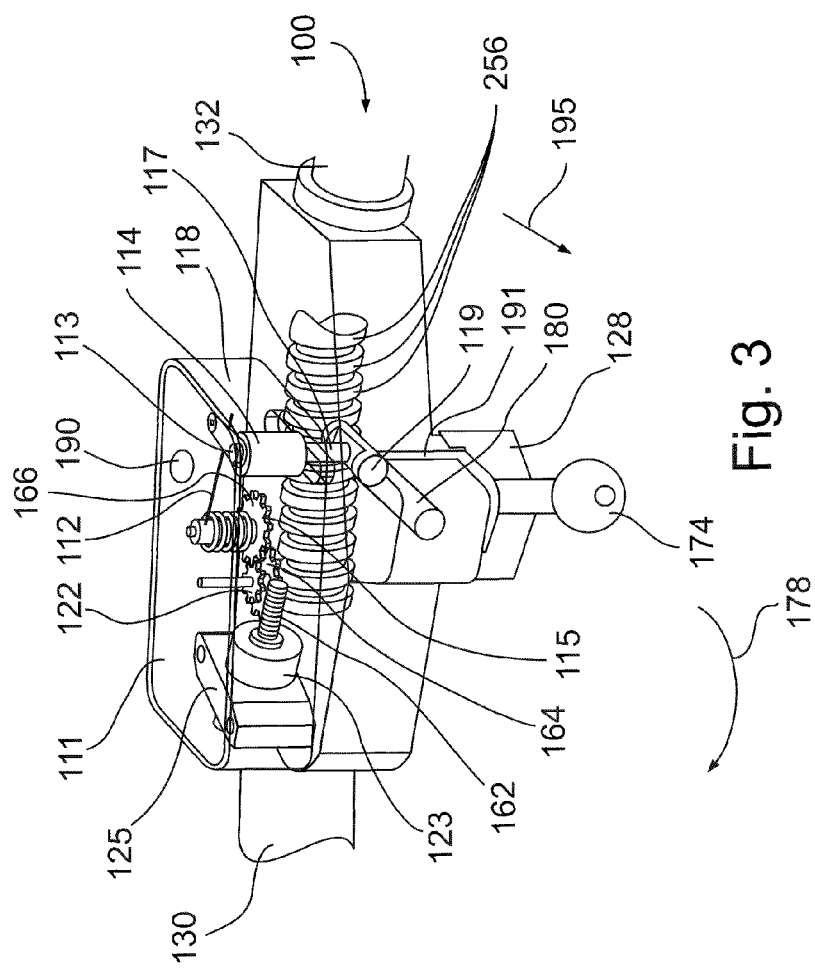
FIG. 3 shows details of a locking mechanism on the crosspiece shown in FIG. 2A, according to an embodiment of the invention.

FIG. 2D shows key 174 being moved in a direction 176 to engage lock 128 and turn lock in a direction 178. As seen in FIG. 3, lock 128 engages a swivel pin 191 that rotates to engage a piston 119. As swivel pin 191 rotates in direction 178, piston 119 moves in a direction 195 in a shaft 180, thereby pulling extension 117 from ratchets 256 and allowing bar 132 to move into tube 130 so that crosspiece 144 may be removed from steering wheel 140 as shown in FIG. 2D.

Alternative Embodiments

Figure 4A:
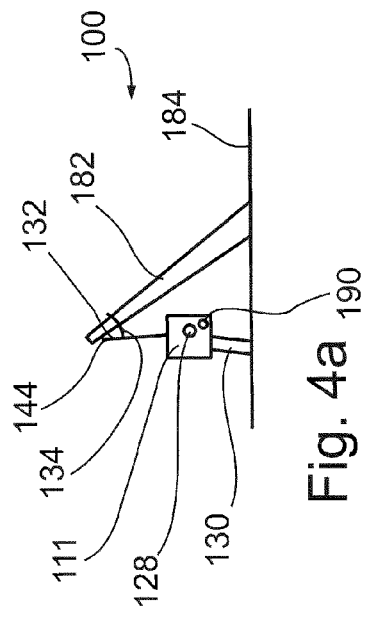
FIGS. 4A-4B show alternative embodiments of the crosspiece shown in FIG. 2A, according to embodiments of the invention.

FIG. 4A shows crosspiece 144 being biased between a handbrake lever 182 and a vehicle chassis surface 184.

Figure 4B:
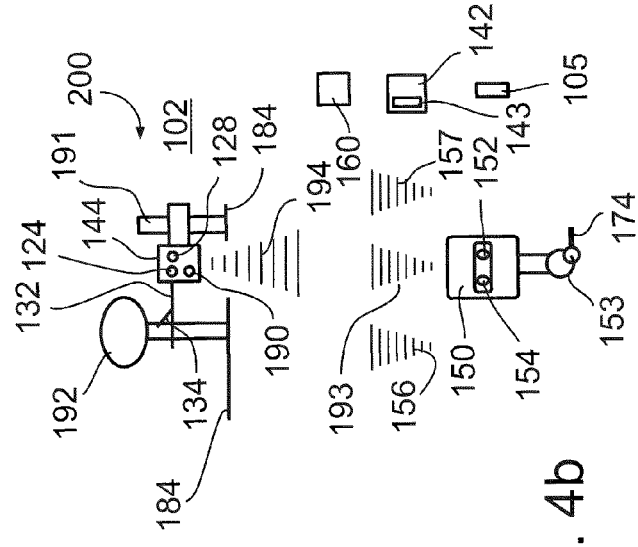

FIG. 4B shows system 200 in which crosspiece 144 is biased between a gear shifter 192 and a securing post 191; the many applications of crosspiece 144 being well-known to those familiar with the art.

In an exemplary embodiment, system 200 demonstrates the disarming of crosspiece 144 in preparation for driving. Initially, the driver enters vehicle 102 and presses a docking button 190 located on housing 111 so that drive transceiver 125 sends a signal 194 that is received by handheld transceiver 150. In some embodiments, transceiver 150 automatically sends automatic wireless signals 193 to drive transceiver 125 and within a period of time, for example two or three seconds, crosspiece 144 will automatically unlock and immobilizer relay 142 will mobilize ignition 160 so that vehicle 102 is drivable. The driver can then remove and store crosspiece 144.

In alternative embodiments, for example when handheld transceiver 150 operates in manual mode, the driver enters vehicle 102 and presses button 190 which generates signal 194. The driver then presses button 152 to generate wireless signals 157 so that crosspiece 144 is released and immobilizer relay 142 mobilizes ignition 160.

Should the driver not start vehicle 102 within a set period of time, for example within 20-30 seconds after pressing button 152, immobilizer relay 142 reactivates immobilization of the ignition.

In an exemplary embodiment, when leaving vehicle 102, the driver merely biases crosspiece between post 197 and gearshift 192 and presses button 190; after which crosspiece 144 automatically locks and immobilizer relay 142 immobilizes ignition 160.

When using handheld transceiver 150 in manual mode, following biasing of crosspiece 144, the driver presses button 190 and then button 152 to initiate the above-noted immobilization process.

Note that in some embodiments, for example when crosspiece 144 is not easily accessed, the driver presses button 154 to activate immobilizer relay 142 alone. Additionally or alternatively, the driver can utilize any additional systems with respect to vehicle 102. For example to activate relay 142, the driver may use a hand held device 105 comprising inter alia, a separate handheld wireless immobilizer or a wireless pager.

Electronic Circuitry

Figure 5:
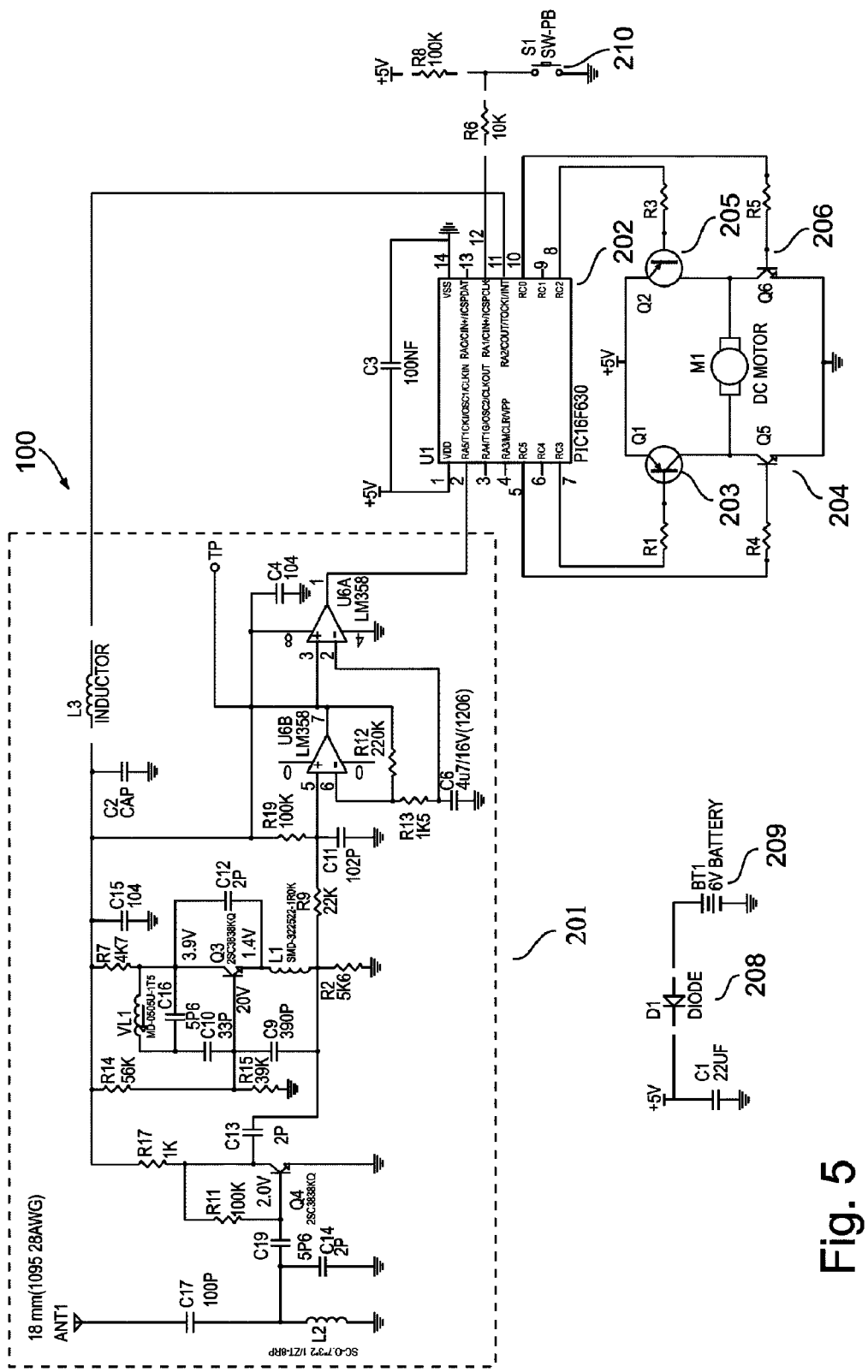
FIG. 5 shows a detailed schematic representation of an electronic associated with said vehicle disabling system shown in FIG. 1; according to an embodiment of the invention.

Referring to FIG. 5, we find the circuitry of system 100, which includes a remote control receiver, 201. The decoding of the random encrypted codes is done in processor 202. Timing and driving pulse for the motor are also generated in processor 202. Transistors 203, 204, 205 and 206 provide drive capability for the motor M1, which latches or unlatches the pin to the mechanical steering wheel lock.

To extend the life of the battery supply, the receiver is optionally in a "sleep mode" and is revived by pressing button 210 on the system before deactivation. In an exemplary embodiment, the power source is 204×AAA Alkaline batteries; and does not exclude other types of batteries such as Lithium and its derivatives.

In embodiments, diode 208 provides polarity protection as well as dropping the 6 volts to approximately 5.3 volts suitable for operating the 5 volt processor. Rechargeable batteries are optionally used in conjunction with a charging socket provided on the system components.

The unit is optionally plugged into the cigarette lighter socket. In an exemplary embodiment, a 3-4 year life can be expected from the batteries.

In embodiments, pseudo random or other encryption is used for the RF coding. The code received is optionally transmitted by a remote controlled transmitter, manually operated or by a remote control operated automatically by movement or other means, the latter offering automatic deactivation.

Within 2 seconds of pressing the "wake up" button on the system, the system unlocks if the driver of the vehicle carries the special remote.

Optionally, plugging a small unit, which contains an encoder and transmitter, into the cigarette lighter socket, deactivates the system on turning on the vehicle's ignition.

System 100 is designed to work with different RF remote control units.

The coding for communication between the remote control and the receiver in the electronic unit attached to the steering wheel lock is optionally encrypted using 64-bit encryption. The output from the processor provides drive via a buffer to energize the open/shut motor.

A signal from a remote control is received by the electronic docking unit and decoded. It is compared with the stored codes in the processor memory and if a match is found, a signal is suitably shaped, timed and buffered to drive a low current motor which drives a pin to release or close the locking mechanism of a typical steering wheel lock.

In an exemplary embodiment, the unit is powered by 4×AAA batteries 209. Rechargeable batteries are optionally used in conjunction with a charging socket included in the docking housing. NiCd, NiMh, Li.Ion type batteries, inter alia, are optionally be used. In an exemplary embodiment, a 2-year life is expected from Alkaline AAA batteries.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art.

Accordingly, the invention is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A vehicle security system for securing a vehicle against theft, the system comprising:
   a) a driving function disablement component configured to bias against a moveable vehicle component, thereby to disable a driving function when biased;
   c) a remotely operable transducer configured to maintain or release biasing in said driving function disablement component; and
   d) a wireless handheld transceiver configured to transmit a wireless drive-activating signal to operate said transducer, wherein said transducer includes a timing sensor configured to sense a fixed period of time in the absence of vehicle movement and release of said biasing against said moveable component and, following said period of time, reinduce said biasing.

2. The system according to claim 1, wherein said transducer includes a locking mechanism for locking said driving function disablement component in said biased position.

3. The system according to claim 1, wherein said moveable vehicle component is any one of the group consisting of a steering wheel, a tire, a clutch, a gear shift, an accelerator pedal, a hand brake lever, and a brake pedal.

4. The system according to claim 1, further comprising an immobilizer and wherein said wireless handheld transceiver is further configured to operate said immobilizer.

5. The system according to claim 4, wherein said immobilizer comprises an electronic vehicle component-immobilizing relay.

6. The system according to claim 5, wherein said electronic vehicle component is any one of the group consisting of: a motor ignition, a fuel pump, a fuel injector, a gearshift, a total vehicle immobilizer, and a brake lock.

7. The system according to claim 5, wherein said transceiver operable immobilizing relay is configured to replace a standard vehicle-immobilizing relay.

8. The system according to claim 1, wherein said drive transceiver includes a docking button such that pressing said button activates said drive transceiver to receive wireless signals from said handheld transceiver.

9. The system according to claim 8, wherein said activated transceiver and said wireless handheld transceiver automatically wirelessly communicate upon said activation.

10. The system according to claim 8, wherein said wireless handheld transceiver additionally includes a manual input configured to activate wireless transmission of said wireless signal following pressing said docking button.

11. The system according to claim 5, wherein said relay additionally includes a time delay circuit which, following a set period time after receiving a wireless relay signal and in the absence of vehicle movement and moveable component movement, said relay again immobilizes said electronic component.

12. The system according to claim 5, wherein said wireless handheld transceiver, said wireless drive transceiver and said immobilizer include programmable memory components configured to be programmed with a unique code such that:
   a) said handheld transceiver wirelessly transmits said code;
   b) said wireless drive transceiver receives and recognizes said wirelessly transmitted code and releases said biased disablement component; and
   c) said immobilizer receives and recognizes said transmitted code and enables said vehicle component.

13. A vehicle security system for securing a vehicle against theft, the system comprising:
   a) a driving function disablement component configured to bias against a moveable vehicle component, thereby to disable a driving function when biased;
   c) a remotely operable transducer configured to maintain or release biasing in said driving function disablement component; and
   d) a wireless handheld transceiver configured to transmit a wireless drive-activating signal to operate said transducer wherein said wireless handheld transceiver, said wireless drive transceiver and said immobilizer include programmable memory components configured to be programmed with unique codes such that:
   a) said handheld transceiver wirelessly transmits a first code and a second code;
   b) said wireless drive transceiver receives and recognizes said wirelessly transmitted first code and releases said biased disablement component; and
   c) said immobilizer receives and recognizes said transmitted second code and enables said vehicle component.

14. The system according to claim 13, wherein at least one of said:

wireless handheld transceiver
said immobilizer; and
said wireless drive transceiver, includes a programmable input for inputting said wireless code.

15. The system according to claim 1, including a drive activation time delay circuit that delays unlocking said locking member by a given period of time following a user-activated input; said time delay circuit being operatively associated with at least one of:
said wireless handheld transceiver; and
said drive wireless transceiver.

16. The system according to claim 1, wherein said moveable component further includes a manually activated lock configured to manually release said biasing.

17. The system according to claim 16, wherein said manually activated locking mechanism comprises a lock barrel configured to receive a user-deployable key.

18. The system according to claim 1, wherein said disablement component is configured to be manually biased against said moveable vehicle component.

19. The system according to claim 1, wherein said disablement component is configured to be manually removed from said component following releasing said biasing in said component.

20. The system according to claim 1, wherein said driving function disablement component comprises a bar that is slidingly set in a hollow tube.

21. The system according to claim 1, wherein said driving function disablement component includes at least one first projection configured to press against said moveable vehicle component when said disablement component is in said biased configuration.

22. The system according to claim 1, wherein said disablement component is configured to bias against a vehicle steering wheel and at least one end of said disablement component is configured to extend beyond said wheel and contact a surface associated with a passenger cabin of said vehicle during rotating of said wheel, thereby substantially preventing rotation of said wheel.

23. A method of temporarily disabling and re-enabling a vehicle, comprising:
fitting a biasable locking component over a driving component,
locking said biasable locking component in a biased position to disable said driving component;
remotely transmitting a first signal to operate an immobilizer to prevent operation of a vehicle engine;
remotely transmitting a second signal to disable said immobilizer to re-enable operation of said vehicle engine; and
remotely transmitting a third signal to unlock said biasable locking component to re-enable said driving component;
wherein said method comprising issuing each of said first, second and third signal respectively from a single remote controller.

* * * * *